US008265805B2

(12) United States Patent  (10) Patent No.: US 8,265,805 B2
Ma et al.  (45) Date of Patent: Sep. 11, 2012

(54) METHOD AND APPARATUS FOR DETECTING ICING CONDITIONS FOR AN AIRCRAFT

(75) Inventors: Art Lee Ma, Everett, WA (US); Steven George Mackin, Bellevue, WA (US); Emily Jane Yannucci, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 900 days.

(21) Appl. No.: 11/938,281

(22) Filed: Nov. 11, 2007

(65) Prior Publication Data

US 2009/0125167 A1 May 14, 2009

(51) Int. Cl.
G06F 7/00 (2006.01)
G06F 19/00 (2011.01)
G08B 23/00 (2006.01)

(52) U.S. Cl. .......................................... 701/14; 340/963

(58) Field of Classification Search .................... 701/14, 701/13, 3; 342/26 B; 340/962, 580, 581; 244/134 R, 134 F; 73/170.26
See application file for complete search history.

(56) References Cited

U.S. PATENT DOCUMENTS

| 3,517,900 | A  | * | 6/1970  | Roussel .......................... 340/962 |
| 5,028,929 | A  | * | 7/1991  | Sand et al. ................... 342/26 B |
| 5,488,375 | A  | * | 1/1996  | Michie ......................... 342/26 B |
| 6,430,996 | B1 | * | 8/2002  | Anderson et al. .......... 73/170.26 |
| 6,819,265 | B2 | * | 11/2004 | Jamieson et al. ............. 340/962 |
| 7,784,739 | B2 | * | 8/2010  | Nichols ...................... 244/134 F |
| 2004/0206854 | A1 | * | 10/2004 | Shah et al. .................... 244/144 |
| 2008/0257033 | A1 | * | 10/2008 | Roberts ....................... 73/170.26 |

* cited by examiner

*Primary Examiner* — Thomas Black
*Assistant Examiner* — Marthe Marc-Coleman
(74) *Attorney, Agent, or Firm* — Law Office of Donald D Mondul

(57) ABSTRACT

A method for detecting icing conditions for an airborne aircraft operating within a zone defined using one or more aircraft-related parameter and one or more environment parameter includes: (a) In no particular order: (1) measuring the aircraft-related parameter(s) to obtain aircraft-related parametric value(s); and (2) measuring the environment-related parameter(s) to obtain environment-related parametric value (s). (b) Employing the aircraft-related parametric value(s) and the environment-related parametric value(s) to determine whether the aircraft is operating within the zone. (c) If the aircraft is operating within the zone, observing elapsed time during which the aircraft is operating within the zone. (d) If the aircraft has operated within the zone for a predetermined elapsed time-in-zone, displaying an alert message for a user to indicate a likelihood of presence of icing conditions.

10 Claims, 3 Drawing Sheets

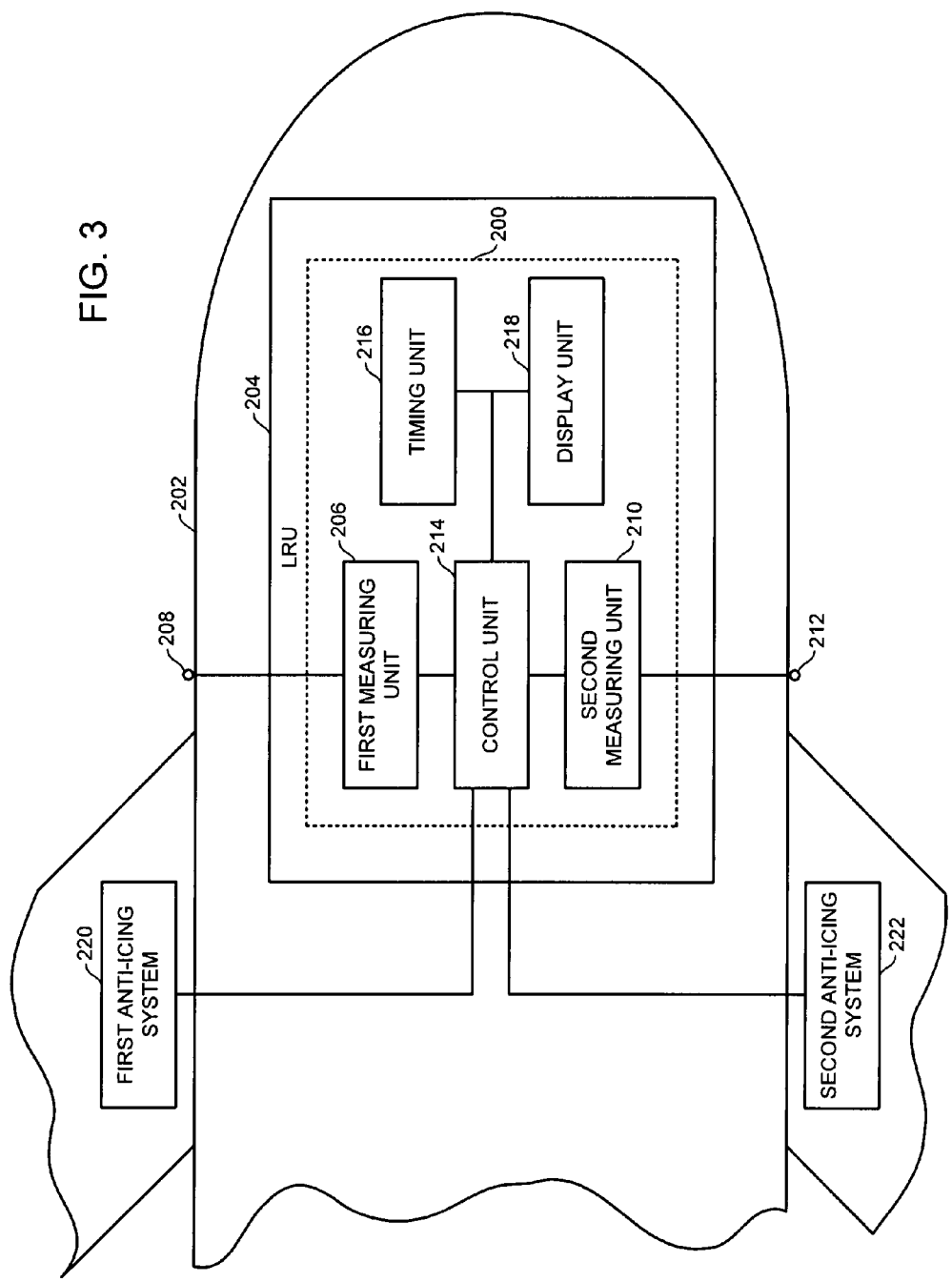

METHOD AND APPARATUS FOR DETECTING ICING CONDITIONS FOR AN AIRCRAFT

FIELD

The present disclosure is directed to detecting or otherwise ascertaining icing conditions for an aircraft, and especially to ascertaining icing conditions within a predefined zone for an airborne aircraft.

BACKGROUND

Aircraft meeting certain criteria may need to be certified by the Federal Aviation Administration (FAA) to operate in United States airspace. Such certified aircraft may be required to be able to detect ice for all points within a predefined zone such as, by way of example and not by way of limitation, a zone or envelope defined in a Federal Aviation Regulation (FAR). A representative such envelope or zone may be defined in FAR, Part 25, Appendix C, known as an Icing Envelope, and may appear at 14 Code of Federal Regulations (14CFR).

There may be a region in which presently available ice detector systems may not detect occurrence of icing on aircraft surfaces. A non-detection region (i.e., a region in which an aircraft's equipment may not detect icing conditions) may be traversed during climb, hold and descent evolutions of an aircraft. Such non-detection of icing may be especially dangerous if an airplane occupies a non-detection region for an extended interval of time.

There is a need for a method and apparatus for detecting icing conditions for an aircraft with improved effectiveness and reliability.

There is a need for a method and apparatus for detecting icing conditions for an aircraft that does not significantly degrade fuel efficiency of a host aircraft.

SUMMARY

A method for detecting icing conditions for an airborne aircraft operating within a zone defined using one or more aircraft-related parameter and one or more environment-related parameter includes: (a) In no particular order: (1) measuring the aircraft-related parameter(s) to obtain aircraft-related parametric value(s); and (2) measuring the environment-related parameter(s) to obtain environment-related parametric value(s). (b) Employing the aircraft-related parametric value(s) and the environment-related parametric value(s) to determine whether the aircraft is operating within the zone. (c) If the aircraft is operating within the zone, observing elapsed time during which the aircraft is operating within the zone. (d) If the aircraft has operated within the zone for a predetermined elapsed time interval, displaying an alert message for a user to indicate a likelihood of presence of icing conditions.

An apparatus for detecting presence of icing conditions for an airborne aircraft operating within a zone, the zone being defined using one or more aircraft-related parameter and one or more environment-related parameter, includes: (a) a first measuring unit for measuring the one or more aircraft-related parameter to obtain at least one aircraft-related parametric value; (b) a second measuring unit for measuring the one or more environment-related parameter to obtain at least one environment-related parametric value; (c) a control unit coupled with the first measuring unit and coupled with the second measuring unit; the control unit employing the one or more aircraft-related parametric value and the one or more environment-related parametric value to determine whether the aircraft is operating within the zone; (d) a timing unit coupled with the control unit; the timing unit recording elapsed time during which the aircraft is operating within the zone; and (e) a display unit coupled with the control unit; the display unit displaying an alert message for a user to indicate a likelihood of presence of icing conditions when the aircraft has operated within the zone for a predetermined elapsed time-in-zone. The control unit activates at least one anti-icing system installed with the aircraft when the aircraft has operated within the zone for a predetermined elapsed time-in-zone.

It is, therefore, a feature of the present disclosure to provide a method and apparatus for detecting icing conditions for an aircraft with improved effectiveness and reliability.

It is a further feature of the present disclosure to provide a method and apparatus for detecting icing conditions for an aircraft that does not significantly degrade fuel efficiency of a host aircraft.

Further features of the present disclosure will be apparent from the following specification and claims when considered in connection with the accompanying drawings, in which like elements are labeled using like reference numerals in the various figures, illustrating embodiments of the disclosure.

BRIEF DESCRIPTION OF THE DRAWINGS

FIG. 3 is a schematic diagram of an example representing the apparatus configured according to the present disclosure.

DETAILED DESCRIPTION

Figure 1:
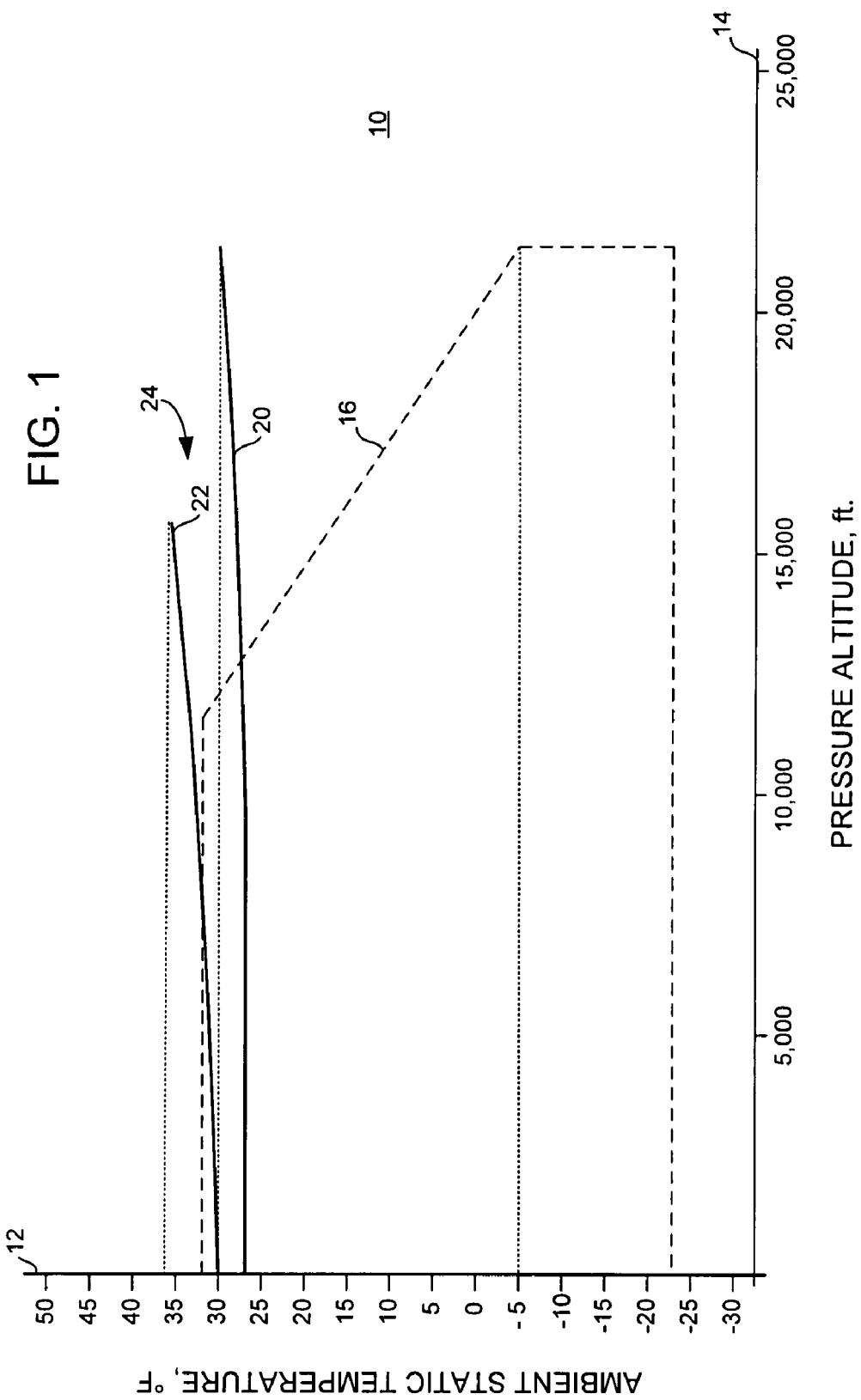
FIG. 1 is a graphic illustration of an example representing the limiting icing envelope established for aircraft.

FIG. 1 is a graphic illustration of an example representing the limiting icing envelope established for aircraft. In FIG. 1, a graphic representation 10 may be presented with respect to a vertical axis 12 representing ambient static temperature in degrees Fahrenheit (° F.), and with respect to a horizontal axis 14 representing pressure altitude in feet. An icing envelope 16 may range from approximately −22° F. to approximately +32° F. Icing envelope 16 may extend from a lower altitude of approximately zero feet to approximately 12,000 feet at +32° F., and may extend from approximately zero feet to approximately 22,000 feet in a temperature range approximately spanning −5° F. to −22° F.

Icing envelope 16 may represent an icing envelope defined by a government agency, such as the Federal Aviation Administration (FAA) in the United States. It may be required that aircraft be able to detect ice anywhere within envelope 16. A curve 20 may represent detection capabilities of a first icing detection system on an aircraft. Curve 20 may represent an icing detection system that may detect ice in a temperature range up to approximately +27° F. at approximately zero altitude and up to approximately +30° F. at approximately 22,000 feet.

A curve 22 may represent a locus of points at which ice will no longer form on the affected portions of the aircraft. Curve 22 may encompass a temperature range up to approximately +30° F. at approximately zero altitude and up to approximately +37° F. at approximately 17,000 feet. One may observe in FIG. 1 that a zone 24 of non-detection may exist between curves 20, 22 in which ice may form on aircraft surfaces, but ice will not form on an ice detector. The present disclosure may address a method and apparatus for detecting icing conditions within icing envelope 16, including a portion of the zone 24 of non-detection. The present disclosure may therefore address a method and apparatus substantially assuring detection of icing conditions within zone 24, insofar as zone 24 is within icing envelope 16. Once icing conditions are detected, the method and apparatus of the present disclosure may engage one or more anti-ice systems on an aircraft. Engagement of an anti-ice system may-be effected after a user, such as an aircraft pilot, visually or otherwise verifies the presence of ice or icing conditions on the aircraft. Alternately, engagement of an anti-ice system may be automatically effected after icing conditions are detected without waiting for independent verification of the presence of ice or icing conditions in the zone of atmosphere that contains the aircraft.

Figure 2:
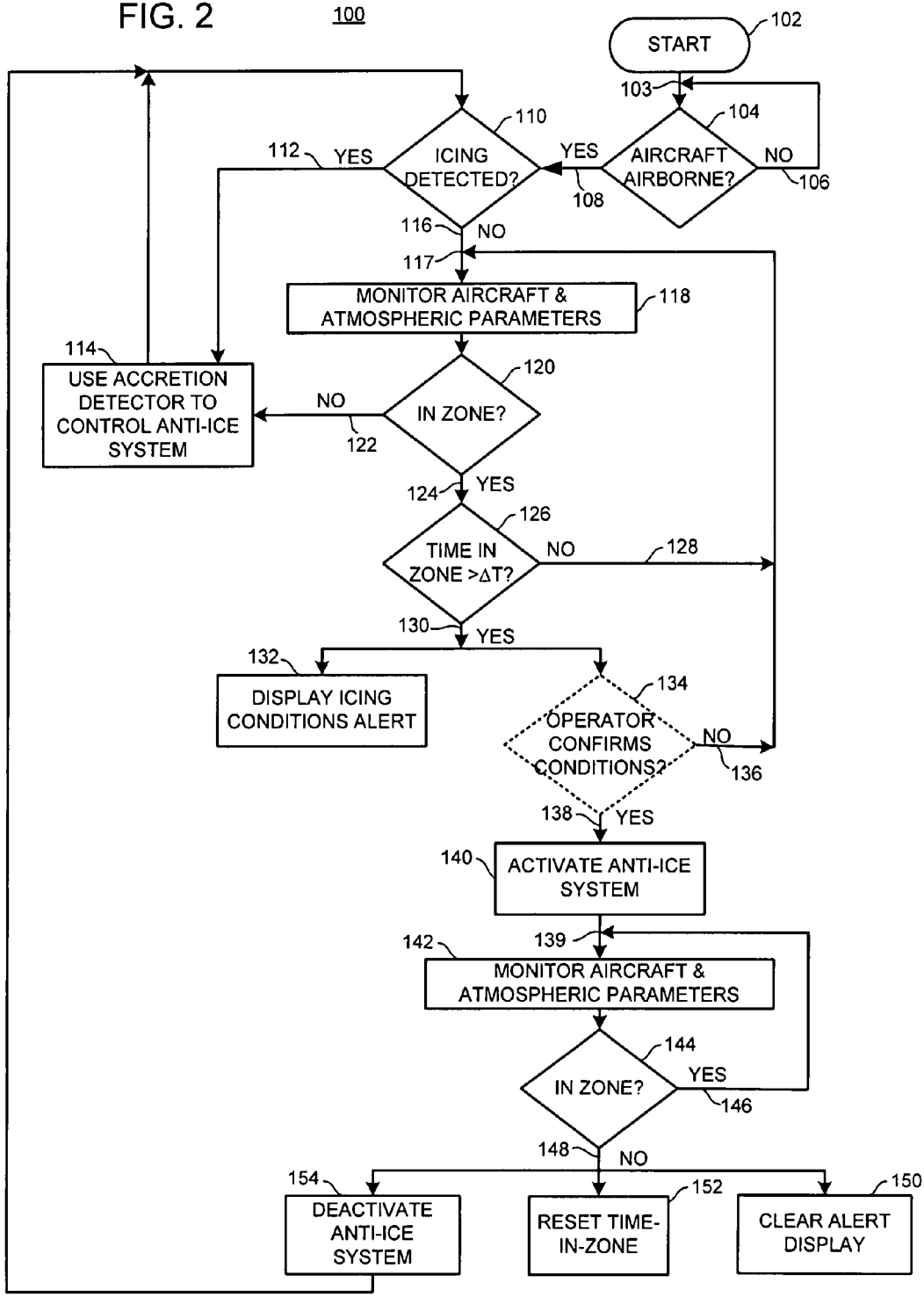
FIG. 2 is a flow chart illustrating operation of the method of the present disclosure.

FIG. 2 is a flow chart illustrating operation of the method of the present disclosure. In FIG. 2, a method 100 for detecting presence of icing conditions in the zone of atmosphere that contains an airborne aircraft operating within a zone may begin at a START locus 102. The zone may be defined using one or more aircraft-related parameter and one or more environment-related parameter. By way of example and not by way of limitation, the zone may be as described in connection with FIG. 1, where zone 16 may be defined by an aircraft-related parameter such as pressure altitude and by an environment-related parameter such as ambient static temperature.

Method 100 may continue with posing a query whether the aircraft is airborne, as indicated by a query block 104. If the aircraft is not airborne, method 100 may proceed from query block 104 via a NO response line 106 and return to a locus 103. Method 100 may proceed from locus 103 to again pose the query indicated by query block 104. If the aircraft is airborne, method 100 may proceed from query block 104 via a YES response line 108 and may pose a query whether icing is detected on the aircraft by ice accretion detector equipment installed on the aircraft, as indicated by a query block 110.

If icing is detected on the aircraft, method 100 may proceed from query block via a YES response line 112 and ice accretion detector equipment installed on the aircraft may be employed to control the one or more anti-ice system installed on the aircraft, as indicated by a block 114. Method 100 may thereafter return to query block 110 to continue inquiring whether icing is detected on the aircraft. If icing is not detected on the aircraft, method 100 may proceed from query block via a NO response line 116 and predetermined aircraft and atmospheric parameters may be monitored, as indicated by a block 118. By way of example and not by way of limitation, an aircraft-related parameter such as pressure altitude and an environment-related parameter such as ambient static temperature (graphic representation 10; FIG. 1) may be monitored as indicated by block 118.

Method 100 may proceed with posing a query whether the aircraft is within a predetermined zone as indicated by a query block 120. By way of example and not by way of limitation, method 100 may inquire whether the aircraft is within zone 16 (FIG. 1). If the aircraft is not within a predetermined zone, method 100 may proceed from query block 120 via a NO response line 122 and ice accretion detector equipment installed on the aircraft may be employed to control the one or more anti-ice system installed on the aircraft, as indicated by a block 114. Method 100 may thereafter return to query block 110 and perform steps indicated by blocks 110, 118, 120. If the aircraft is within a predetermined zone, method 100 may proceed from query block 120 via a YES response line 124 and pose a query whether the aircraft has been in the predetermined zone for a time greater than a predetermined time interval $\Delta T$, as indicated by a query block 126. By way of example and not by way of limitation, time interval $\Delta T$ may have a value ranging from approximately 10 minutes to approximately 20 minutes. In some conditions predetermined time interval $\Delta T$ may have a value of approximately 5 minutes or less.

If the aircraft has not been in the predetermined zone for a timer greater than a predetermined time interval $\Delta T$, method 100 may proceed from query block 126 via a NO response line 128 to a locus 117. Method 100 may proceed from locus 117 to perform steps represented by blocks 118, 120, 126. If the aircraft has been in the predetermined zone for a timer greater than a predetermined time interval $\Delta T$, method 100 may proceed from query block 126 via a YES response line 130 and, in no particular order, may (1) display an icing conditions alert, as indicated by a block 132, and (2) pose a query whether an operator (e.g., a pilot) confirms icing conditions are present, as indicated by a query block 134. An icing conditions alert may be displayed, by way of example and not by way of limitation, in the cockpit of the aircraft for viewing by one or more persons stationed in the cockpit.

If an operator does not confirm that icing conditions are present, method 100 may proceed from query block 134 via a NO response line 136 to locus 117. Method 100 may proceed from locus 117 to perform steps represented by blocks 118, 120, 126, 130, 134. If an operator confirms that icing conditions are present, method 100 may proceed from query block 134 via a YES response line 138 and an anti-ice system installed on the aircraft may be activated, as indicated by a block 140.

Query block 134 is indicated in dotted lint format to indicate that requiring an operator to confirm icing conditions are present may be an optional step of method 100. Requiring such a human confirmation of presence of icing conditions may be required, by way of example and not by way of limitation, when one intends that activation of an anti-ice system (block 140) is to be manually effected only after such human confirmation is made. By not including query block 134 in performance of method 100, one may automatically effect activation of an anti-ice system installed on the aircraft (block 140) upon determination that the aircraft is in the predetermined zone (block 120) and has been in the predetermined zone for a time greater than predetermined time interval $\Delta T$ (block 126).

Method 100 may proceed with monitoring predetermined aircraft and atmospheric parameters, as indicated by a block 142 and posing a query whether the aircraft is still in the predetermined zone, as indicated by a query block 144.

If the aircraft is in the predetermined zone, method 100 may proceed from query block 144 via a YES response line 146 to a locus 139. Method 100 may proceed from locus 139 to perform steps represented by blocks 142, 144. If the aircraft is not in the predetermined zone, method 100 may proceed from query block 144 via a NO response line 148 and, in no particular order, (1) clear the alert display (block 132), as indicated by a block 150, (2) reset the amount of time that the aircraft has been in the zone (i.e., time-in-zone; block 126), as indicated by a block 152 and (3) deactivate the installed anti-ice system, as indicated by a block 154.

Method 100 may thereafter proceed to query block 110. Method 100 may proceed from query block 110 to perform steps represented by blocks 118, 120, 126, 132, 134, 140, 142, 144, 150, 152, 154. In an alternate arrangement, method 100 may proceed from block 154 to locus 103 or to query block 104 and thereafter perform subsequent steps as described above.

FIG. 3 is a schematic diagram of an example representing the apparatus configured according to the present disclosure. In FIG. 3, an apparatus 200 for detecting presence of icing conditions for an airborne aircraft 202 operating within a zone may be included as software; firmware; hardware or a combination of two or more of software, firmware and hardware in a Line Replaceable Unit (LRU) 204 on board aircraft 202. The zone may be defined using one or more aircraft-related parameter and one or more environment-related parameter. Apparatus 200 may include a first measuring unit 206 for measuring the one or more aircraft-related parameter to obtain at least one aircraft-related parametric value. First measuring unit 206 may be coupled with a sensor node 208 exterior of aircraft 202.

Apparatus 200 may include a second measuring unit 210 for measuring the one or more environment-related parameter to obtain at least one environment-related parametric value. Second measuring unit 210 may be coupled with a sensor node 212 exterior of aircraft 202.

Apparatus 200 may include a control unit coupled with first measuring unit 206 and coupled with second measuring unit 210. Control unit 214 may employ the one or more aircraft-related parametric value and the one or more environment-related parametric value to determine whether aircraft 202 is operating within the zone.

Apparatus 200 may include a timing unit coupled with control unit 214. Timer unit 216 may record elapsed time during which aircraft 202 is operating within the zone.

Apparatus 200 may include a display unit 218 coupled with control unit 214. Display unit 218 may display an alert message for a user to indicate a likelihood of icing conditions when aircraft 202 has operated within the zone for a predetermined elapsed time-in-zone.

Control unit 214 may effect activation of-at least one anti-icing system 220, 222 installed with aircraft 202 when aircraft 202 has operated within the zone for a predetermined elapsed time-in-zone.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

The invention claimed is:

1. A method for detecting presence of icing conditions for an airborne aircraft operating within a zone; said zone being defined using altitude and ambient temperature; the method comprising:
 (a) in no particular order:
  (1) measuring said altitude substantially adjacent said aircraft to obtain an altitude value; and
  (2) measuring said ambient temperature substantially adjacent said aircraft to obtain an ambient temperature value;
 (b) employing said altitude value and said ambient temperature value to determine whether said aircraft is operating within said zone; said zone being a zone of non-detection in which ice may form on aircraft surfaces but may not form on an ice detector;
 (c) if said aircraft is operating within said zone, observing elapsed time during which said aircraft is operating within said zone of non-detection; and
 (d) if said aircraft has operated within said zone for a predetermined elapsed time-in-zone, displaying an alert message for a user to indicate a likelihood of presence of icing conditions.

2. A method for detecting presence of icing conditions for an airborne aircraft operating within a zone as recited in claim 1 wherein the method further comprises the following step (e) occurring after step (d):
 (e) activating at least one anti-icing system installed with said aircraft.

3. A method for detecting presence of icing conditions for an airborne aircraft operating within a zone as recited in claim 2 wherein the method further comprises the following steps (f) and (g) occurring after step (e):
 (f) if said aircraft exits said zone, in no particular order:
  (1) deactivating said at least one anti-icing system;
  (2) resetting said elapsed time-in-zone to an predetermined value; and
  (3) resetting said alert message to not indicate a likelihood of presence of icing conditions; and
 (g) repeating steps (a) through (f) so long as said aircraft remains airborne.

4. A method for detecting presence of icing conditions for an airborne aircraft operating within a zone as recited in claim 1 wherein the method further comprises the following step (c-add) occurring after step (c) and before step (d):
 (c-add) obtaining confirmation by a user of existence of icing conditions; and wherein the method further comprises the following step (e) occurring after step (d):
 (e) activating at least one anti-icing system installed with said aircraft.

5. A method for detecting presence of icing conditions for an airborne aircraft operating within a zone as recited in claim 3 wherein the method further comprises the following steps (f) and (g) occurring after step (e):
 (f) if said aircraft exits said zone, in no particular order:
  (1) deactivating said at least one anti-icing system;
  (2) resetting said elapsed time-in-zone to an predetermined value; and
  (3) resetting said alert message to not indicate a likelihood of presence of icing conditions; and
 (g) repeating steps (a) through (f) so long as said aircraft remains airborne.

6. A method for detecting presence of icing conditions for an aircraft; the method comprising:
 (a) determining whether said aircraft is airborne;
 (b) if said aircraft is airborne, in no particular order:
  (1) measuring altitude substantially adjacent said aircraft to obtain an altitude value; and
  (2) measuring ambient temperature substantially adjacent said aircraft to obtain an ambient temperature value;
 (c) employing said altitude value and said ambient temperature value to determine whether said aircraft is operating within a defined zone; said defined zone being a zone of non-detection in which ice may form on aircraft surfaces but may not form on an ice detector;
 (d) if said aircraft is operating within said defined zone, observing elapsed time during which said aircraft is operating within said defined zone;
 (e) if said aircraft has operated within said defined zone for a predetermined elapsed time-in-zone, in no particular order:
  (1) displaying an alert message for a user to indicate a likelihood of presence of icing conditions; and
  (2) activating at least one anti-icing system installed with said aircraft.

7. A method for detecting presence of icing conditions for an aircraft as recited in claim 6 wherein the method further comprises the following step (d-add) occurring after step (d) and before step (e)(2):
- (d-add) obtaining confirmation by a user of presence of icing conditions.

8. A method for detecting presence of icing conditions for an aircraft as recited in claim 7 wherein the method further comprises the following steps (f) and (g) occurring after step (e)(2):
- (f) if said aircraft exits said zone, in no particular order:
  - (1) deactivating said at least one anti-icing system;
  - (2) resetting said elapsed time-in-zone to an predetermined value; and
  - (3) resetting said alert message to not indicate a likelihood of presence of icing conditions; and
- (g) repeating steps (a) through (f).

9. A method for detecting presence of icing conditions for an aircraft as recited in claim 6 wherein the method further comprises the following steps (f) and (g) occurring after step (e)(2):
- (f) if said aircraft exits said zone, in no particular order:
  - (1) deactivating said at least one anti-icing system;
  - (2) resetting said elapsed time-in-zone to an predetermined value; and
  - (3) resetting said alert message to not indicate a likelihood of presence of icing conditions; and
- (g) repeating steps (a) through (f).

10. An apparatus for detecting presence of icing conditions for an airborne aircraft operating within a zone; said zone being defined using altitude and ambient temperature; the apparatus comprising:
- (a) a first measuring unit for measuring said altitude substantially adjacent said aircraft to obtain an altitude value;
- (b) a second measuring unit for measuring said ambient temperature substantially adjacent said aircraft to obtain an ambient temperature value;
- (c) a control unit coupled with said first measuring unit and coupled with said second measuring unit; said control unit employing said altitude value and said ambient temperature value to determine whether said aircraft is operating within said zone;
- (d) a timing unit coupled with said control unit; said timing recording elapsed time during which said aircraft is operating within said zone; and
- (e) a display unit coupled with said control unit; said display unit displaying an alert message for a user to indicate a likelihood of presence of icing conditions when said aircraft has operated within said zone for a predetermined elapsed time-in-zone;

said control unit effecting activation of at least one anti-icing system installed with said aircraft when said aircraft has operated within said zone for a predetermined elapsed time-in-zone.

\* \* \* \* \*